United States Patent
Moore et al.

(10) Patent No.: US 7,037,551 B2
(45) Date of Patent: May 2, 2006

(54) EXTRUDED GRANOLA PROCESS

(75) Inventors: Gary Steven Moore, McHenry, IL (US); Susan L. Franz, Palatine, IL (US)

(73) Assignee: Frito-Lay North America, Inc., Plano, TX (US)

( * ) Notice: Subject to any disclaimer, the term of this patent is extended or adjusted under 35 U.S.C. 154(b) by 96 days.

(21) Appl. No.: 10/656,712

(22) Filed: Sep. 5, 2003

(65) Prior Publication Data

US 2005/0053697 A1    Mar. 10, 2005

(51) Int. Cl.
*A23L 1/164*    (2006.01)

(52) U.S. Cl. .................. 426/620; 426/516; 426/618; 426/619

(58) Field of Classification Search .............. 426/89, 426/94, 274, 275, 618, 619, 620, 516
See application file for complete search history.

(56) References Cited

U.S. PATENT DOCUMENTS

| 4,871,557 | A | * | 10/1989 | Linscott | 426/93 |
| 5,093,146 | A | * | 3/1992 | Calandro et al. | 426/619 |
| 5,413,805 | A | * | 5/1995 | Delpierre et al. | 426/620 |
| 6,419,911 | B1 | * | 7/2002 | Bailey | 424/70.13 |
| 6,773,734 | B1 | * | 8/2004 | Sirohi et al. | 426/89 |

* cited by examiner

*Primary Examiner*—Lien Tran
(74) *Attorney, Agent, or Firm*—Colin P. Cahoon; Chad E. Walter; Carstens & Cahoon, LLP

(57) ABSTRACT

A method for creating bite-sized or filled pieces of chewy or crunchy granola. The invention is an improved process for manipulating and shaping chewy granola without having the granola lose its characteristic texture. The improved process includes: adding extra water to the ordinary ingredients of chewy granola, allowing the water to soften the granola, extruding or shaping the softened granola, and drying or removing the water from the softened granola thereby restoring the granola to about its original texture and composition.

45 Claims, 3 Drawing Sheets

EXTRUDED GRANOLA PROCESS

BACKGROUND OF THE INVENTION

1. Technical Field

The present invention relates to the composition and process of preparing granola. In particular, the invention relates to preparing a chewy or crunchy granola such that it can be extruded and thereby formed into a shape of arbitrary size such as a bite-sized piece. In addition, extruded granola may comprise a filling. The process differs from the traditional method of preparation by adding water to a traditional granola mixture, allowing the wet granola dough to soften by the absorption of this added, or extra water, extruding the wet granola dough, cutting the wet granola dough, and finally removing the additional water from the wet granola dough resulting in a finished granola product.

2. Description of Related Art

Granola is a well-known product in the food industry. Granola typically comprises of cereal grains, crisp rice, binder syrup and optionally inclusions, a term in the art for pieces of fruit, nuts, or chocolate. Binder syrup is made of an aqueous solution of simple sugars such as corn syrup, glucose, or fructose.

U.S. Pat. No. 4,451,488, issued to Cook, on May 29, 1984, teaches the manufacture of chewy granola. Chewy granola is produced from the ordinary ingredients of granola with the addition of polyhydric alcohols to the binder syrup. Gylcerin and sorbitol are typical polyhydric alcohols added to the binder syrup. Table 1 lists the ingredients in a typical formulation for binder syrup used to produce chewy granola. This formulation for binding syrup includes corn syrup, granulated sugar, corn syrup solids, gylcerin, sorbitol, salt, vegetable shortening, and water, as shown by percent weight in the example listed in Table 1. The granulated sugar is constituted of one or more edible saccharides such as glucose, fructose, maltose, saccharose, honey, or molasses.

TABLE 1

Ingredients for Binder Syrup for Chewy Granola

| Ingredient | Formula wt. % |
|---|---|
| Corn Syrup | 47.0 |
| Sugar, granulated | 15.0 |
| Corn Syrup Solids | 14.0 |
| Gylcerin, usp 99% | 11.0 |
| Sorbitol solution, 70% (w/w) | 3.0 |
| Salt | 1.0 |
| Vegetable Shortening | 8.0 |
| Water | 1.0 |
| Total = | 100.0 |

Binder syrup is typically prepared by heating the gylcerin, sorbitol, shortening and corn syrup together in a tank to 120° F. The remainder of the ingredients (granulated sugar, corn syrup solids, and salt) are then added to the tank. This mixture is heated to 130° F.; once it has reached this temperature, it is ready to be mixed with the other ingredients of chewy granola shown in Table 2.

A typical chewy granola comprises granola cereal, crisp rice, binder syrup (such as that described above), and inclusions. An example of a specific formulation is shown in Table 2. In this application, all percentages are by weight unless otherwise specified.

TABLE 2

Ingredients for a Typical Chewy Granola

| Ingredient | Formula wt. % (With Inclusions) |
|---|---|
| Granola Cereal | 47.0 |
| Crisp Rice | 8.0 |
| Binder Syrup (see Table 1) | 34.0 |
| Inclusions | 11.0 |
| Total = | 100.0 |

The process to create granola bars is relatively straight-forward and is shown in FIG. 1. The ingredients 1 are serially added to a continuous mixer 2. The cereal grains and rice are added first, the binder syrup is added second and the inclusions are added last. The inclusions are added last because they may be susceptible to melting from the relatively hot binder syrup. Also, the inclusions are more susceptible to mechanical breakdown and should receive as little processing time as possible.

The mixture at this stage is between ambient temperature (typically 70° F.), and the temperature of the binder syrup (about 130° F.). The overall mixture of granola ingredients, or chewy granola, at this stage is about 6% water by weight. Manufacturers typically use a continuous flow interrupted flight or paddle mixer for production because it mixes the ingredients in the shortest amount of time, transfers the least amount of energy to the ingredients, and causes relatively little mechanical breakdown.

The granola mixture at this point is transferred onto a slabbing conveyor 3 where the mixture is compressed with large rollers 4 to a desired thickness, typically one-half inch. A typical slabbing conveyor is about three feet in width. The mixture is partially cooled 5 as it is rolled out. The slab is sliced 6 and then cut into rectangular bars with a guillotine cutter 7. Each granola bar at this point is about three and one-half inches in length, one to one and one-half inches wide, and weighs between 28 and 35 grams. The bars are cooled 8 to ambient temperature, about 70° F., and packaged 9. The final overall water content is about 6%, about the same as when the granola mixture entered the production process. The composition of the granola does not change throughout the production process.

A traditional apparatus for slabbing, compressing, and cutting granola is illustrated in FIG. 2a and FIG. 2b. FIG. 2a and FIG. 2b are both schematic representations of the process where FIG. 2a is a head-on view and FIG. 2b is a side view. With reference to FIG. 2a, the granola mixture is transferred along a conveyor table 20 from left to right on a conveyor belt 21 (shown in FIG. 2a, but hidden from view in FIG. 2b). The mixture passes beneath a series of product rollers 23 in a void space 22 where the mixture is gradually compressed to a desired thickness, typically one-half inch, creating a continuous sheet of product. After compression, the granola mixture is cooled and passes through a slab slicer 24 in order to divide the continuous sheet into multiple lanes of product. These lanes are then cut into bars by a guillotine cutter 25 before being cooled to roughly ambient temperature and sent to packaging.

The traditional production process is limited in several ways. One limitation is the slicing and cutting speed. The typical production rate is about 6,000 pounds per hour. The conveyor table 20 and guillotine cutter 25 limit the form of granola bars to a rectangle. The guillotine cutter 25 is economically bound to operate within a specific range of operation. It is undesirable for the guillotine cutter 25 to cut granola into smaller bars or pieces because for each cut, granola generates non-recyclable waste fragments. The ratio of waste to finished product increases as the size of the finished granola product decreases. Thus, the smaller the pieces, the higher the waste and hence expense of the product. Another economic limitation is related to production speed. A bite-sized piece of granola is difficult to produce because either the cutting speed may have to be increased beyond its normal limit, or the line speed may have to be slowed with a concomitant reduction in production efficiency. For example, a Quaker Chewy® granola bar is typically about 1.125 inches wide and 3.62 inches long and weighs 29 grams. A line speed of 18 feet per minute requires the guillotine cutter 25 to operate at approximately 60 cuts per minute and yields approximately 6,400 pounds of product per hour. A bite sized piece that is about 1.125 inches wide and 1.125 inches long would require a guillotine cutter 25 to run at 192 cuts per minute to maintain the same line speed and accompanying production rates. Unfortunately, guillotine cutters cannot presently operate faster than 180 cuts per minute. Thus, even when the guillotine cutter operates at the maximum possible speed of 180 cuts per minute, line speed drops to 16.9 feet per minute. Thus, when smaller pieces are produced, overall production is slowed, which results in a higher costs of operation.

There are other known substitutes for cutting granola into bars, but they operate at even slower speeds than the guillotine cutter 25. For example, a Bepex brand ultrasonic guillotine is limited to 80 cuts per minute. A water knife cutter, which makes cuts as it travels back and forth across the belt width, can travel only 100 feet per minute. Thus, for belt width of approximately 3 feet, there is a maximum of only 33 cuts per minute.

Another limitation arises in the traditional production process because Granola is not susceptible to significant manipulation during production because its texture is easily destroyed. The dry grains of granola are susceptible to mechanical destruction and are generally not suited to extrusion or other similar processing. In addition, the traditional apparatus for slabbing, compressing, and cutting granola, as depicted in FIGS. 2a and 2b, does not enable the use of a filling.

Accordingly, a need exists for an improved apparatus and method to create small bite-sized pieces of granola. Further, a need exists for a method to create small granola pieces where the granola maintains its traditional and expected texture, appearance and flavor. Further, a need exists for an apparatus and method to create a granola piece that can be formed into an arbitrary shape or form. Further, a need exists for an improved apparatus and method to produce a granola bite or bar with a filling. Finally, a need exists for an improved apparatus and method to economically create bite-sized pieces and/or filled bars of granola in large quantities.

SUMMARY OF THE INVENTION

The proposed invention comprises a novel process to generate bite-sized chewy or crunchy granola pieces and granola pieces or bars comprising a filling by low-pressure extrusion after a dough rest period that allows the granola to absorb extra water. The finished granola piece has an appearance and texture substantially similar to chewy or crunchy granola bars produced by prior art methods with the traditional and expected texture, appearance and flavor of chewy granola.

Granola bars comprise primarily cereal grains, crisp rice, and binding syrup. Optionally, fruit, nut, or chocolate pieces are included. In this novel process, the granola is initially formed into a dough by adding additional water, above that amount used in a typical prior art formulation, to the typical ingredients for chewy granola in a dough mixer. The wet granola dough is mixed very briefly, one to ten minutes, and allowed to rest for at least one hour, preferably two hours or longer. The wet granola dough at this stage is much more malleable than an ordinary granola mixture. Surprisingly, after the hold or rest period, the wet granola dough is much more extrudable than immediately after adding the water. The wet granola dough is minimally compressed as it passes through an extruder and is cut into bite-sized pieces as it exits the extruder die. In one embodiment, the pieces are then dried to a moisture level between about four and ten percent, removing most or all of the extra water initially added to make an extruded chewy granola bite. In another embodiment, the wet granola dough is dried at a higher temperature to develop a toasted flavor in the resulting extruded chewy granola composition. In yet another embodiment, the pieces are dried to a moisture level of less than or about 4%, removing all the extra water initially added to make an extruded crunchy granola bite. In sum, by adding water, resting the dough, and then removing the water, the granola can be manipulated by other than traditional processes, namely extrusion. At the end of this new process, the extruded chewy or crunchy granola maintains its normal, traditional consistency and texture.

The invention also comprises an apparatus and method to form large quantities of granola pieces of arbitrary shape and size. The invention is capable of producing bite-sized chewy or crunchy granola pieces economically and with less waste. The invention is also capable of producing a granola bite or bar comprising a filling.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

Figure 1:
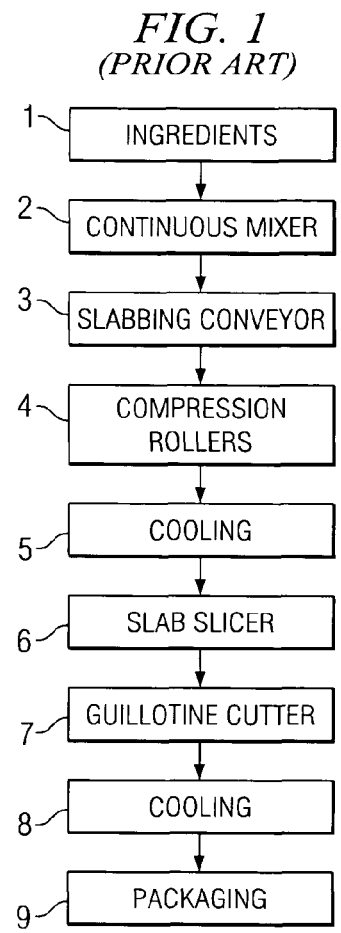
FIG. 1 is a flow chart of the typical prior art process for forming chewy granola bar product.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION

The invention comprises a novel process to generate unique bite-sized chewy or crunchy granola pieces. This Detailed Description first presents the composition of the extruded chewy granola. It then describes the machinery and process required to produce bite-sized chewy granola pieces. Finally, it describes how this production process is significantly different from the ordinary production of chewy granola bars.

Composition of Extruded Chewy Granola

One element of this invention is the addition of extra water, to form a wet granola dough, to the ordinary ingredients of chewy granola such that water initially makes up a higher percentage weight of the total mixture. As used in this invention, chewy granola comprises the binder syrup ingredients listed in Table 3, infra, and the dry ingredients listed in Table 4 infra. As used in this invention, a wet granola dough comprises chewy granola and extra water. Extra water is defined as the amount of water in the wet granola dough composition that exceeds about 6% water by weight. In an ordinary formulation for chewy granola, the weight percentage of water in the ingredients is about 6%. When the weight percentage of water in granola ingredients is about 4% or less, the granola is generally crunchy rather than chewy. In one embodiment of the present invention, the total percentage by weight of water in the wet granola dough is 10%, and preferably about 12%. As the proportion of water is reduced below 12%, milling or the breakdown of the oats and rice occurs during extrusion causing undesirable degradation of the texture and appearance of the final product. This extra water, absorbed over time by the chewy granola, enables the granola dough to be processed through an extruder without the resultant milling effect, as described in greater detail below.

Like ordinary granola, extruded chewy granola uses a binder syrup. As used in this invention, extruded chewy granola is defined as wet granola dough that has undergone a drying step, yet still comprises at least 4% water by weight. The composition of one formulation for binder syrup is shown in Table 3. In addition, various acceptable ranges of ingredients used in the binder syrup are also shown. As indicated below, binder syrup comprises corn syrup, granulated sugar, corn syrup solids, gylcerin, sorbitol, salt, and vegetable shortening or oil.

TABLE 3

Ingredients for Binder Syrup For Extruded Chewy Granola

| Ingredient | Formula wt. % | Range % |
|---|---|---|
| Corn Syrup | 49.0 | 40–60 |
| Sugar, granulated | 12.0 | 0–25 |
| Corn Syrup Solids | 14.0 | 0–20 |
| Gylcerin, usp 99% | 10.0 | 5–15 |
| Sorbitol solution, 70% (w/w) | 5.0 | 0–10 |
| Salt | 1.0 | 0–2 |
| Vegetable Shortening or Oil | 9.0 | 5–15 |

In this invention, there are two different formulation types for extruded chewy granola, and they are both shown in Table 4. One formulation comprises inclusions and the other does not. In addition, various acceptable ranges of ingredients that comprise the extruded chewy granola are also indicated. Both formulations comprise cereal grains, wheat flour, binder syrup (described above), and water. The cereal grains comprise rolled oats, granola cereal, and crisp rice.

The formulation with inclusions differs slightly from the formulation without inclusions. Comparing the ingredients within Table 4, the formulation with inclusions has proportionately less of each ingredient to allow for the addition of the inclusions.

TABLE 4

Ingredients for Extruded Chewy Granola

| Ingredient | Formula wt. % (Without Inclusions) | Formula wt. % (With Inclusions) | Range % |
|---|---|---|---|
| Rolled Oats | 23 | 21 | 0–50 |
| Granola Cereal | 22 | 20 | 0–50 |
| Wheat Flour | 10 | 9 | 1–20 |
| Crisp Rice | 8 | 7 | 0–20 |
| Binder Syrup (see Table 3) | 29 | 27 | 20–40 |
| Water | 8 | 7 | 4–10 |
| Inclusions | 0 | 9 | 0–20 |

By comparing the amounts of corresponding ingredients from Table 2 and Table 4, the extruded chewy granola formulations have a slightly different composition from that of ordinary chewy granola. For example, extruded chewy granola comprises wheat flour whereas ordinary chewy granola typically has none. The formulation for extruded chewy granola comprises wheat flour because it improves the extrusion process. Specifically, the wheat flour helps the extrusion rolls 42 grip the dough to generate the pressure necessary to pass the dough through the extrusion die 46. Too much wheat flour, however, gives the granola a more cookie-like texture and appearance. Consequently, a desired percentage range of wheat flour, as indicated in Table 4, is from about 1 to about 20 percent. Alternately, other types of flours, or combinations of flours, can be used in replace of wheat flour to improve the extrusion process. Alternate flours include, but are not limited to, oat, rice, corn, potato, and pre-gelatinized flours. Alternatively, starches, pre-gelatinized starches, hydrocolloids, and celluloses can be used to replace wheat flour. Any starch or flour that acts to thicken the dough can be used.

In one embodiment, the rolled oats in Table 4 are encapsulated to help protect their integrity and minimize degradation during extrusion. The oats can be encapsulated with carbohydrates, hydrocolloids, waxes, fats, and mixtures thereof. In one embodiment the oats are coated with a sugar syrup and dried to about a 3% moisture content before the dough-mixing step 33 in FIG. 3a.

A formula for the preferred encapsulated oats is shown in the table below.

TABLE 5

Ingredients of Coated Oats

| Ingredient | Formula wt. % | Range % |
|---|---|---|
| Rolled oats | 75 | 50–99.8 |
| Sugar | 13 | 0–50 |
| Coconut oil | 4.5 | 0–50 |
| Water | 7.5 | 0–30 |

In another embodiment, the crisp rice in Table 4 are encapsulated to help protect their integrity and minimize degradation during extrusion. The crisp rice can be encapsulated with carbohydrates, hydrocolloids, waxes, fats and mixtures thereof. In one embodiment the crisp rice are coated with a sugar syrup and dried prior to 3% moisture (by weight) before the dough-mixing step 33 in FIG. 3a. A formula for the preferred encapsulated crisp rice is shown in the table below.

TABLE 6

Ingredients for Coated Crisp Rice

| Ingredient | Formula wt. % | Range % |
|---|---|---|
| Crisp rice | 75 | 50–99.8 |
| Sugar | 15 | 0–50 |
| Coconut oil | 2.5 | 0–50 |
| Water | 7.5 | 0–30 |

Process for Extruded Chewy Granola

Figure 3A:
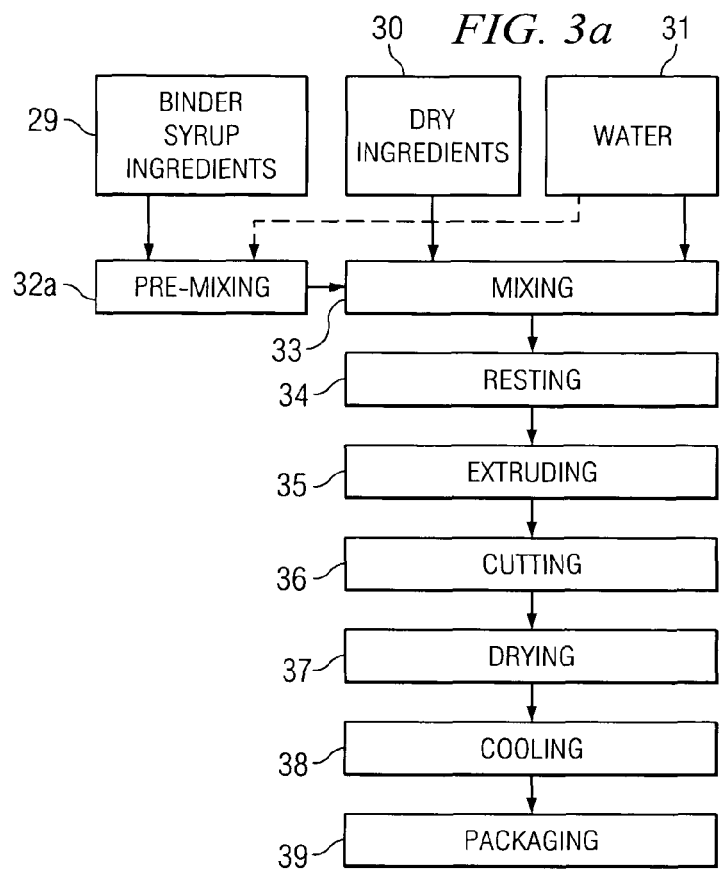
FIG. 3a is a flow chart showing the process for forming bite-sized extruded chewy granola pieces pursuant to one embodiment of the present invention.
Figure 2A:
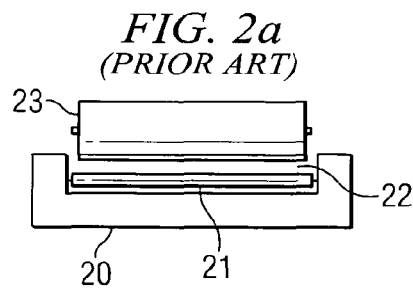
FIG. 2a is a head-on schematic view of a slabbing conveyor used to roll granola bar product.
Figure 3B:
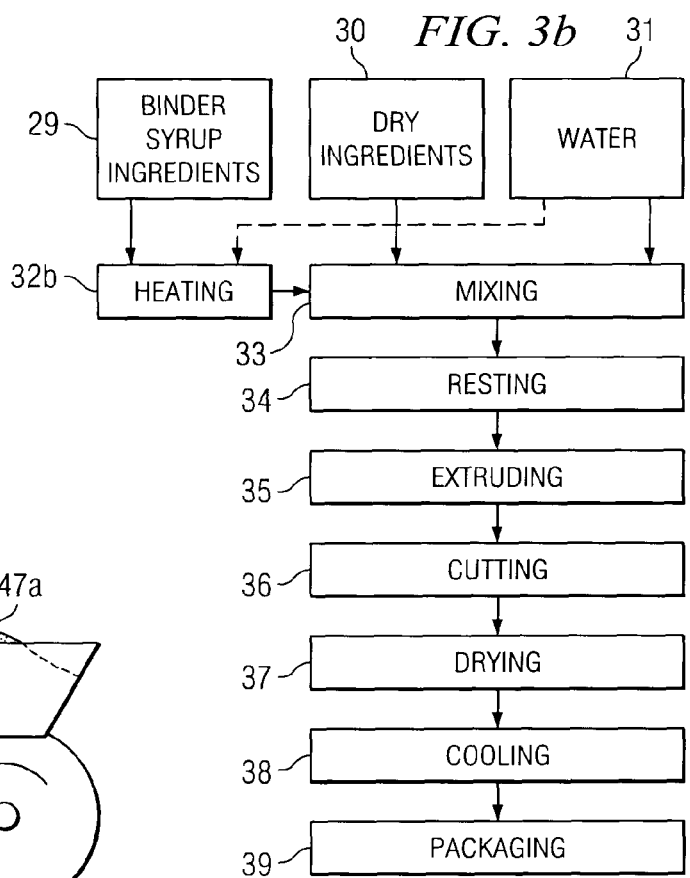
FIG. 3b is a flow chart showing the process for forming bite-sized extruded chewy granola pieces pursuant to another embodiment of the present invention.

Two embodiments of the present invention are presented in FIGS. 3a and 3b. They illustrate at least two ways that the ingredients may be added and mixed together. These two ways are shown for purposes of illustration and not limitation. There are undoubtedly numerous other ways to add and mix the ingredients together, however, the essence of the invention, namely the use of relatively high water content and resting the granola for a period of time to enhance extrusion characteristics, should not be overshadowed by these different ways of mixing and/or heating or minor compositional changes of the granola.

In the first and preferred embodiment, referring to FIG. 3a, the ingredients of a binder syrup 29 such as those shown in Table 3, are introduced and pre-mixed in the dough mixer 33 before the dry ingredients 30 are added. Specifically, the binding syrup ingredients 29, are added and pre-mixed 32a in a sigma blade dough mixer 33 at high speed (80 RPM) for about 3 minutes. A Double Sigma Mixer, such as Model DA300 manufactured by Peerless of Sidney, Ohio can be used. Alternatively, a Single Sigma Mixer, such as Model SD7, also manufactured by Peerless can be used. However, the mixer 33 is not limited to dough mixers and a prior art continuous mixer 2 as depicted in FIG. 1 may be used as the mixer 33 anywhere a mixer 33 is referred to in this invention. This pre-mixing 32a of the binder syrup 29 is known in the cookie industry as a creaming step. In this embodiment, the binder syrup is not heated. In one embodiment about 435 pounds of syrup are pre-mixed 32a at high speed for about 3 minutes. Subsequently, the dry ingredients 30 are added to the dough mixer 33 and the contents of the dough mixer 33 are further mixed for about 2 minutes at low speed (40 RPM) before being rested 34 into a dough trough. In one embodiment, water 31 is added to the binding syrup 29 at substantially the same time as the dry ingredients as indicated by the solid line on FIG. 3a. Thus, water 31 and the dry ingredients 30 are not pre-mixed in this embodiment; only the binder syrup ingredients 29 are pre-mixed 32a. In an alternative embodiment, water 31 is added to the binding syrup 29 for the pre-mixing 32a step as indicated by the dashed line on FIG. 3a. In yet another embodiment, (not shown on FIG. 3a or 3b), some or all of the dry ingredients 30 are pre-hydrated with extra water 31 before the pre-hydrated dry ingredients 30 are combined with the binding syrup 29 to form a pre-hydrated cereal grains. In this embodiment, the pre-hydrated cereal grains need only be rested for about one-half hour. The pre-hydrated cereal grains are then mixed with the binder syrup 29 to form the wet granola dough. If only some of the cereal grains are pre-hydrated, any desired remaining cereal grains would be added at substantially the same time as the binder syrup 29. In this embodiment, the pre-hydrated dry ingredients 30 undergo the resting step 34 prior to the mixing step 33. Referring back to the embodiments depicted by FIGS. 3a and 3b, the wet granola dough, preferably at a temperature substantially between 75–85° F., is held or rested 34 in dough troughs. As used in this invention, a dough trough is simply a location to rest or hold the wet granola dough and can be any location that can serve this purpose including, but limited to, storage bins.

Regardless of the order in which the ingredients are mixed, the wet granola dough, as its name implies, begins to have a dough-like consistency. Referring to FIG. 3a or 3b, the wet granola dough is passed into a dough trough for resting 34. When exiting the dough mixer 33 for resting 34, the wet granola dough comprises a water content between 10 and 16% by weight, and preferably about 12% water by weight. Too little water in the dough will lead to poor extruding characteristics, while too much can alter the characteristics of the final product and make piece formation difficult.

In a second embodiment, referring to FIG. 3b, the binder syrup ingredients 29, such as those shown in Table 3, are combined in a tank or kettle for heating 32b in the following manner. Gylcerin, sorbitol, shortening and corn syrup are combined, mixed and heated to about 120° F. Granulated sugar, corn syrup solids and salt are then added. Then, in one embodiment, water 31 is added to the binder syrup mix tank for heating 32b as shown by the dashed line on FIG. 3b. This liquid mixture is heated 32b to about 130° F. At this point, the heated 32b binder syrup/water mixture is ready for further processing in the mixer 33. In another embodiment, the water 31 is added directly to the mixer 33 as shown by the solid line in FIG. 3b, and only the binder syrup ingredients 29 are heated 32b.

Alternatively, again referring to FIG. 3b, in a variation in the preparation of the binder syrup, all of the binder syrup ingredients 29 and the extra water 31 are mixed together and maintained at about 70 to 130° F. in a tank or kettle that can be used for heating 32b. At this point, the binder syrup/water mixture in the tank is ready for further processing in the dough mixer 33. In this embodiment, referring to FIG. 3b, before any liquid ingredients from the tank are added, the dry ingredients 30 are mixed for about one minute in a mixer 33. The dry ingredients 29 are mixed at low speed, which corresponds to about 40 revolutions per minute ("RPM"). For a typical batch of approximately 1,500 pounds, the dry ingredients account for about 1,065 pounds. Subsequently, approximately 435 pounds of the liquid ingredients from the tank are added to the dough mixer 33. This wet granola dough is mixed for about two minutes at low speed (40 RPM).

Referring to FIGS. 3a and 3b, after the wet granola dough is mixed in either embodiment above, it is next held or rested 34 for at least one hour, preferably about two hours, in a trough. The hold time allows the water to act as a plasticizing agent that permeates, or migrates into the dry ingredients 30 to make them sufficiently malleable, or rubbery for the extrusion process 35. The term "holding" or "resting" 34 used herein refers to allowing the wet granola dough to absorb the added water without working the mixture.

The maximum duration of the rest 34 time is bound by the possibility of microbial spoilage. Spoilage of the wet granola dough is possible because of the favorable conditions for microbial growth: warmth, moisture and an energy source in the form of sugars or other carbohydrates. Further, there is a sliding scale of softening action depending on the temperature at which the wet granola dough is held. For example, if the wet granola dough is held at 130° F., the softening takes less time to occur than when the dough is held at 90° F. Thus, the ideal hold time can vary from at least one hour if the dough is held at a relatively warm temperature, e.g. 130° F., to a relatively long time such as several hours if the dough is held at a relatively cool temperature, e.g. 50° F.

After the rest period, the wet granola dough is transported to an extruder. In one embodiment, the extruder is a roll extruder typically used for making cookies. The wet granola dough can be transported to the extrusion step 35 by a number of ways known to those in the art including, but not limited to, a trough hoist or a conveyor belt. Referring to FIG. 4a, the roll extruder has a bin or container 40 that holds the wet granola dough above at least two rollers 42 turning toward each other, one in a clockwise fashion and the other in a counterclockwise fashion. Using the example of a roll extruder manufactured by APV Baker of Grand Rapids, Mich., the rollers 42 are each about 10.5 inches in diameter and between 39 to 48 inches wide. These rollers 42 are separated by about a ½-inch gap or dough cavity 43. In one embodiment, this gap 43 is adjustable to match the conditions of manufacture, such as the pressure required for extrusion.

Directly beneath the rollers 42 is a filler block 41. The filler block 41 runs the width of the rollers 42 spaced within the filler block 41 is a plurality of channels 44 for dough to flow through. These rollers 42 turn to generate pumping pressure by gripping and dragging the dough into a channel 44. In one embodiment of the invention, the width of the channel 44 is about 1.6 inches. At the end of the channel 44, a die 46 shapes the dough into the desired configuration (size and shape). In one embodiment, the opening of the die 46, called an extrusion port (described below), is less than one inch in diameter, and preferably about ⅞ of an inch in diameter.

Figure 5:
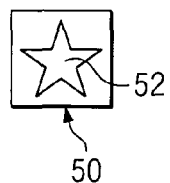
FIG. 5 is a schematic diagram of one embodiment of the shaping die for the extruder device that forms bite-sized extruded chewy granola pieces pursuant to the present invention.
Figure 2B:
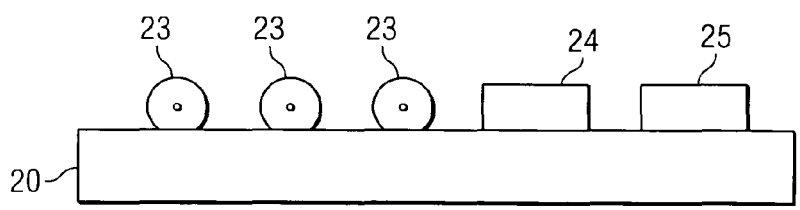
FIG. 2b is horizontal schematic view of the same slabbing conveyor of FIG. 2a showing the product rollers and slicers used to form granola bar product.

With reference to FIG. 5, the die 46 from FIG. 4a is made up of at least one opening or extrusion port 52. In typical, prior art extrusion, the dough can be exposed to sudden changes in the size of the channel 44 and size of the die opening 52. In this invention, the width of the channel 44 and the opening of the extrusion port 52 are selected such that there is a minimal and gradual reduction of the cross-sectional area. The extrusion channel 44, in a preferred embodiment, comprises non-stick surfaces.

Another feature of the die 46 in a typical food-manufacturing environment is that it is removable. By having removable dies 46, different shapes of granola product can be made by changing to a die 46 with a new shape in the die port 52. During production the full set of dies 46 can either all the same shape in the die port 52, or they can be different shapes that run simultaneously. Further, dies 46 and correspondingly, die shapes, can be quickly changed during production such that the filler block 41 does not have to be changed out. This feature saves both time and money and is commonly used in food processing equipment.

Referring again to FIG. 4a and FIG. 5, if the size of the extrusion port 52 is improperly selected relative to the size of the channel 44, the granola components are milled into smaller particle sizes and the texture of the final product is degraded as the granola is extruded. Normally, extruders have a large pressure differential from one side of the extrusion port 52 to the other such that the product is exposed to relatively large physical forces such as a high shear rate and high shear strain. Generally, the size of the extrusion port 52 in an ordinary extruder may be very small relative to the size of the channel 44 through which the product flows. This size difference is known as the die compression ratio. The die compression ratio is defined as the cross-sectional area of the die 46 inlet divided by the cross-sectional area of the die outlet 48. For example, with reference to FIG. 4a the cross-sectional area of the inlet is the cross-sectional area of the die 46 where it mates with the filler block 41. The cross-sectional area of the outlet is the cross-sectional area of the die outlet 48. The die compression ratio is preferably between 1 and 6 and in one embodiment about 2.5. In addition to controlling the die compression ratio, in one embodiment, the total compression ratio and the filler block 41 compression ratios are also optimized. The total compression ratio is defined as the cross-sectional area of the channel 44 inlet divided by the cross-sectional area of the die outlet 48. The total compression ratio is preferably between 1 and 10 and in a preferred embodiment about 5. The filler block 41 compression ratio is defined as the cross-sectional area of the channel 44 inlets divided by the cross-sectional area of the channel 44 outlets. The filler block 41 compression ratio is preferably between 1 and 3 and in a preferred embodiment about 2.

FIG. 5 shows the extrusion port in the shape of a star. However, FIG. 5 is by way of illustration, and not by limitation. The shape of the extrusion port 52 can be fashioned to create other shapes including, but not limited to, squares, ovals, airplanes, pinwheels, doughnuts, and animal silhouettes. In one embodiment of the invention, the die 46 comprises at least one opening or extrusion port 52. However, in a manufacturing environment, the die 46 may comprise many extrusion ports 52, for example, 20 to 30 ports, to allow a relatively large volume of dough to pass through. Typically, there is one die 46 associated with each channel 44. In one embodiment, using 26 ports, the amount of granola processed is about 2,500 pounds per hour.

Referring again to the overall extrusion process 35 in FIG. 3a or 3b, and apparatus in FIG. 4, the chewy granola with its dough-like consistency passes through the extruder and passes into a cutting step 36. In one embodiment, as the granola leaves the extrusion die 46, the granola is immediately cut at the surface of the die 46 into its desired length such as less than one inch long, and preferably into pieces in the range of ¼" to ¾" in length. In one embodiment, this cutting step 36 is accomplished with a wire cutter, which is an oscillating wire harp that is capable of making between 60 and 200 cuts per minute as the granola leaves the extruder ports 52. However, in other embodiments, the cutting step 36 may be performed down stream of the extrusion step 35 by another type of cutter such as a traditional guillotine cutter or rotary cutter.

The granola is cut into pieces that weigh about 3–10 grams, and optimally 5.5 grams, an ideal bite size for the consumer. This size is also ideal for handling through the machinery and for packaging in convenient quantities by weight for sale in the retail market. For example, individual packages would ideally comprise between 30 and 45 grams of product.

Referring again to FIG. 3*a* or 3*b*, after the granola pieces are extruded 35 and cut 36, they are dried 37 or baked in an oven to remove the extra water that originally gave the granola its dough-like consistency. In an alternative embodiment, the granola pieces are dried 37 first and then cut 36. After drying 37, the chewy granola is returned to a composition of about 8% water by weight. In some cases, after the drying step, the extruded chewy granola may comprise slightly higher water contents, but should not exceed 10% water by weight. In one embodiment, the granola pieces are transported through the oven on a sheet metal conveyor made of solid carbon steel. In one embodiment, the drying 37 process is carried out at a sufficiently low temperature to dry the chewy granola, but not to overly modify or cook the same. This can be accomplished by drying the granola in an oven for 5–10 minutes at a temperature of less than 350° F. Referring to FIGS. 3*a* and 3*b*, in a variation of this embodiment, the drying 37 is done by baking for about 7 minutes at 300° F. After leaving the oven 37, the moisture content of the chewy granola pieces is between 6 and 10% by weight.

In an alternative embodiment, the extruded chewy granola is dried such that the water is less than 4% by weight, and becomes extruded crunchy granola. Extruded crunchy granola is formed, in one embodiment, by drying the granola in an oven for 10–20 minutes at a temperature greater than 250° F.

After drying 37, the granola pieces can be cooled 38 by cooling fans blowing ambient or chilled air over the granola product. The granola pieces are then transported along conveyor belts to be packaged 39. In one embodiment, the granola pieces are packaged with 6 to 8 vertical form fill and seal (VFFS) baggers, typical in the food industry. A typical package is about 37 grams (1.3 ounces) and contains about 7 pieces of chewy granola that are about 5.5 grams each.

Figure 4B:
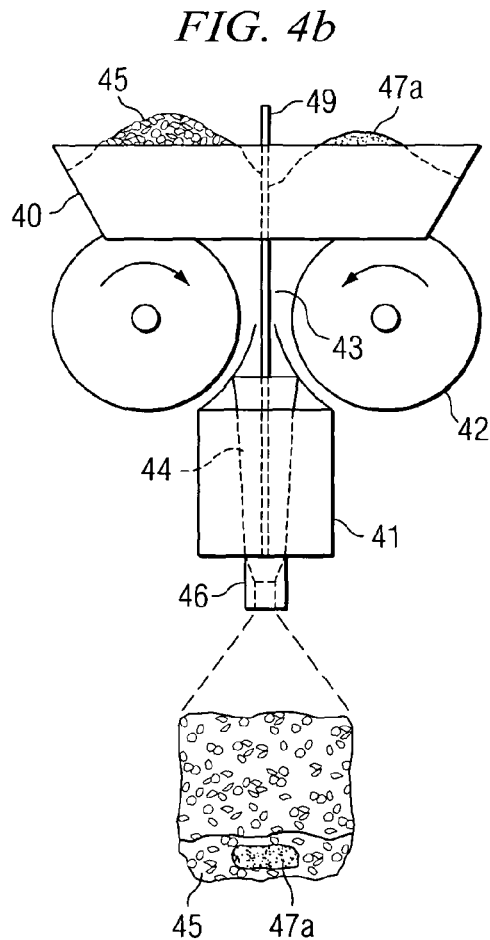
FIG. 4b is a schematic diagram of one embodiment of the extrusion device for forming a filled granola piece or bar comprising a filling pursuant to the present invention.
Figure 4A:
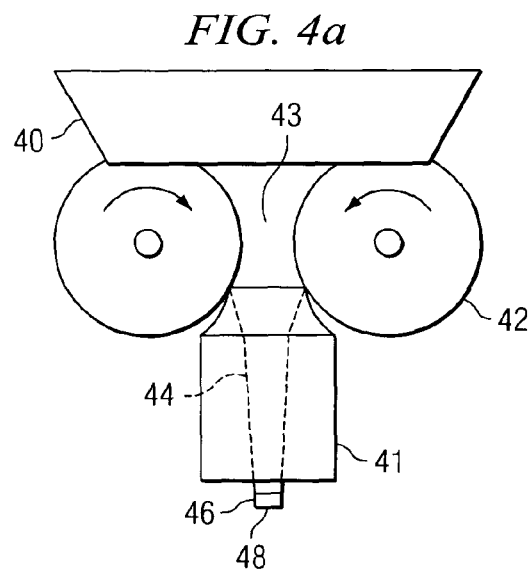
FIG. 4a is a schematic diagram of one embodiment of the extrusion device for forming bite-sized extruded chewy granola pieces pursuant to the present invention.
Figure 4C:
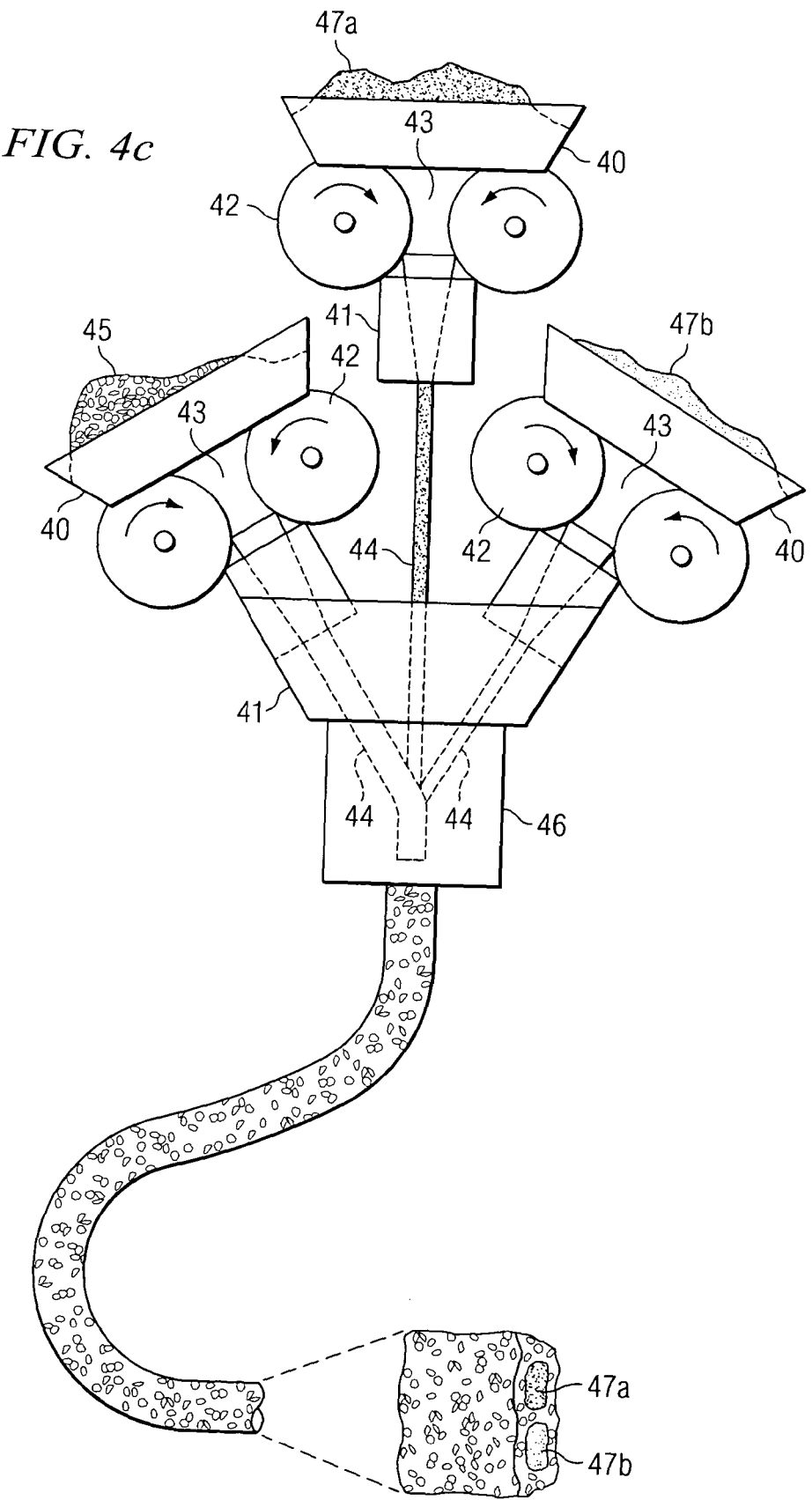
FIG. 4c is a schematic diagram of one embodiment of the extrusion device for forming a filled granola piece or bar comprising a plurality of fillings pursuant to the present invention.

In another embodiment, referring to FIGS. 4*b* and 4*c*, a filled granola piece is made during the extrusion process. Filled products are well known in the art. Examples include Fig Newtons® and Quaker Fruit and Oatmeal Bars®. However, there has never been a filled granola bar or piece because of prior difficulty encountered in extruding granola.

In one embodiment, as depicted in FIG. 4*b*, one roll extruder is used. As shown in FIG. 4*b*, a divider 49 in the container 40 separates the filling 47*a* and the wet granola dough 45. The filling 47*a* can be any pumpable material including, but not limited to, a fruit paste for fruit fillings, a yogurt compound, a custard based filling, a chocolate based filling, a fat-based compound such as nougat, a cream filling, or a sugar based compound such as caramel. The wet granola dough 45 is pumped into an annular area that surrounds a hollow tube (not shown) within the co-extrusion die 46. The filling 47*a* is pumped through the hollow tube as the wet granola dough 45 is pumped alongside in the annular area. The hollow tube may be circular or non-circular. The wet granola dough 45 and the filling 47*a* then converge to feed a single die port. Exiting the port is a continuous rope of dough with one or more fillings inside. The rope may be circular or non-circular. The rope is cut or pinched into individual bars or bite-sized pieces at the exit of the die 46, or at some point later downstream, either before or after the drying 37 step as shown in FIGS. 3*a* and 3*b*.

In one embodiment, as depicted in FIG. 4*c*, three roll extruders are used; one for each component in this triple-extrusion embodiment. Each roll extruder provides the pumping pressure to move the wet granola dough 45 and fillings 47*a* 47*b* through a die assembly. Although a roll extruder is depicted in this embodiment for the fillings 47*a* 47*b*, any pump designed for high viscosity fluids can be used. The three components, comprised of the wet granola dough 45 jacket and two fillings 47*a* 47*b*, are extruded individually through a channel 44 and combined in the co-extrusion die 46 such that the granola jacket is wrapped around the fillings 47*a* 47*b*. In this embodiment, there are two hollow tubes, one for each filling, in the common die 46. The co-extrusion die 46 can comprise one rope produced as shown in FIG. 4*b*, or in an alternative embodiment, the die 46 can produce multiple ropes of filled granola. Although FIG. 4*b* depicts a double extrusion process, the double extrusion (one filling) process can also be performed by using an apparatus comprising two roll extruders similar to the one shown in FIG. 4*c*.

In one embodiment, the granola bar line would be have about 10 to 20 die ports in the die assembly to simultaneously produce 10 to 20 filled granola ropes. The finished granola pieces, cut from the ropes, can be of numerous shapes and sizes including but not limited to a traditional bar-shaped food product from about 20 to 60 grams or smaller bite-sized pieces from about 3 to 20 grams.

Differences from Ordinary Granola Processing

The current invention is very different from the traditional process for creating granola. First, this novel process creates bite-sized pieces economically and efficiently. Traditional granola processing is unable to cut granola into arbitrary shapes and sizes without generating substantial non-recyclable waste. Because of the slabbing process, the traditional granola product is limited to rectangular shapes, or at least to shapes with square corners. The current invention allows the granola to be formed into a wafer-like product with an arbitrary silhouette or outline. These granola pieces have an arbitrary thickness limited only by the composition of the granola.

This invention involves additional processing time compared to that of traditional granola processing. Traditional processing from mixing to packaging can be completed over several minutes. In this invention, the processing time is increased to at least 2 hours because the chewy granola must rest in the presence of the extra water, allowing the dry ingredients to sufficiently absorb it, and allowing the wet granola dough to soften in consistency.

This invention also involves extra heating or drying 37. Because extra water 31 is added to the traditional ingredients of granola 29, 30, this extra water 31 must be removed before the product is restored to its traditional texture and consistency. Care must be taken not to damage the granola as it is heated or dried 37 to remove the water.

Moreover, this invention allows the use of an extruder, which not only allows productivity levels to be maintained while making smaller, bite sized pieces, by allowing more cuts per minute, but also reduces the amount of non-recyclable waste fragments inherent in a guillotine cutter 25. In addition, the bite-sized pieces are produced while preserving its traditional texture and consistency. Further, various fillings can now be added to granola pieces. In short, this invention has many components strongly different from traditional granola processing.

While the invention has been particularly shown and described with reference to a preferred embodiment, it will be understood by those skilled in the art that various changes in form and detail may be made therein without departing from the spirit and scope of the invention. For example, the dimensions may be changed to increase or decrease the overall size of the granola pieces; the shapes of the granola pieces may be changed; and the granola composition may be varied to adjust the texture and flavor of the final product, and to accommodate various flavor combinations, inclusions, and/or fillings. Further, the means for cutting the product need not be one particular type, but could include any number of commonly available cutting devices. Different thicknesses of the final product may be desired. The overall intent of this invention is to process and manipulate chewy granola to create bite-sized granola pieces.

What is claimed is:

1. A method for making individual pieces of extruded chewy granola comprising the steps of:
   (a) Mixing water, at least two dry ingredients selected from rolled grains, crisp rice, and one or more inclusions, and binder syrup to form a wet granola dough;
   (b) Resting said wet granola dough for at least 1 hour;
   (c) Extruding said rested wet granola dough through an opening to form an extruded granola;
   (d) Cutting said extruded granola into pieces; and
   (e) Drying said granola pieces.

2. The method of claim 1 wherein said binder syrup is pre-mixed with water prior to said binder syrup's addition to dry ingredients to form said wet granola dough at step a).

3. The method of claim 1 wherein said binder syrup is pre-mixed with water and maintained at a temperature between about 70° F. to about 130° F. prior to said binder syrup's addition to dry ingredients to form said wet granola dough at step a).

4. The method of claim 1 wherein a binder syrup is pre-mixed without water prior to said binder syrup's addition to dry ingredients and water to form said wet granola dough step a).

5. The method of claim 1 wherein dry ingredients are mixed with water prior to said binder syrup's addition to said dry ingredients wherein said binder syrup is at a temperature between about 70° F. and about 130° F., to form said wet granola dough at step a).

6. The method of claim 1 wherein said dry ingredients are pre-mixed prior to said binder syrup's addition to said dry ingredients to form a chewy granola prior to step a).

7. The method of claim 1 wherein said dry ingredients and water are pre-mixed prior to said binder syrup's addition to said dry ingredients to form said wet granola dough at step a).

8. The method of claim 1 wherein glycerin, sorbitol, shortening and corn syrup are mixed and heated to about 120° F. and wherein granulated sugar, corn syrup solids and salt are then added to form a binder syrup prior to said binder syrup's addition to said dry ingredients to form a chewy granola prior to step a).

9. The method of claim 8 wherein water is added to said binder syrup to form a mixture and wherein said mixture is heated to about 130° F.

10. The method of claim 1 wherein said wet granola dough comprises at least 9 percent water by weight.

11. The method of claim 1 wherein said wet granola dough comprises between about 6 percent and about 10 percent water by weight.

12. The method of claim 1 wherein said wet granola dough comprises between about 10 percent and about 14 percent water by weight.

13. The method of claim 1 wherein said extruding of step (c) occurs with a die compression ratio of between about 1 and about 6.

14. The method of claim 1 wherein said extruding of step (c) occurs with a die compression ratio of between about 2 and about 3.

15. The method of claim 1 wherein said extruding of step (c) occurs with a filler compression ratio of between about 1 and about 3.

16. The method of claim 1 wherein said extruding of step (c) occurs with a total compression ratio of between about 1 and about 10.

17. The method of claim 1 wherein said extruding of step (c) occurs with a total compression ratio of between about 4 and about 6.

18. The method of claim 1 wherein said extruded chewy granola piece formed by steps (c) and (d) is non-rectangular in shape.

19. The method of claim 1 wherein the cutting of step (d) produces bite-sized extruded chewy granola pieces.

20. The method of claim 1 wherein said extruded chewy granola pieces after the drying of step (e) comprise between about 4 and about 10 percent water by weight.

21. The method of claim 1 wherein said drying of step (e) takes place in an oven.

22. The method of claim 1 wherein said drying of step (e) occurs below 400° F.

23. The method of claim 1 wherein said drying of step (e) occurs between about 250° F. and about 350° F. and for about 5 to about 10 minutes.

24. The method of claim 1 wherein said drying of step (e) occurs below 200° F.

25. The method of claim 1 wherein said drying of step (e) occurs below 130° F.

26. The method of claim 1 wherein said extruded chewy granola pieces become extruded crunchy granola pieces after the drying of step (e) and wherein said crunchy granola pieces comprise between about 0 to about 4 percent water by weight.

27. The method of claim 26 wherein said drying of step (e) occurs above about 250° F for about 10 to 20 minutes.

28. The method of claim 1 wherein said dry ingredients are mixed with a sigma blade mixer in a batch process.

29. The method of claim 1 wherein dry ingredients are mixed with a continuous mixer.

30. The method of claim 1 wherein wet granola dough is extruded with a roll extruder.

31. The method of claim 30 wherein said roll extruder comprises a plurality of rolls with about an 11-inch diameter.

32. The method of claim 30 wherein said roll extruder comprises rolls at least 5 inches in diameter.

33. The method of claim 30 wherein said roll extruder is about 36 inches to about 50 inches wide.

34. The method of claim 1 wherein said extruded chewy granola pieces are filled with a filling at step c) to become a filled granola piece.

35. The method of claim 34 wherein said filling is selected from the group consisting of a fruit filling, a fat-based compound, a sugar-based compound, a chocolate-based filling, a cream-based compound, a custard-based compound, a yogurt compound, and mixtures thereof.

36. The method of claim 1 wherein said wet granola dough is extruded with a screw extruder.

37. The method of claim 1 wherein said dry ingredients comprise rolled oats and wherein said rolled oats are encapsulated in an edible coating selected from the group consisting of a carbohydrate, a hydrocolloid, a wax, a fat, and mixtures thereof.

38. The method of claim 37 wherein said encapsulated rolled oats comprises:
    about 50 to 99.8 percent rolled oats;
    about 0 to 50 percent sugar;
    about 0 to 50 percent coconut oil; and
    about 0 to 30 percent water.

39. The method of claim 37 wherein said encapsulated rolled oats comprises:
    about 60 to 90 percent rolled oats;
    about 5 to 20 percent sugar;
    about 0 to 10 percent coconut oil; and
    about 0 to 10 percent water.

40. The method of claim 1 wherein said dry ingredients comprise crisp rice and wherein said crisp rice are encapsulated in an edible coating selected from the group consisting of a carbohydrate, a hydrocolloid, a wax, a fat, and mixtures thereof.

41. The method of claim 40 wherein said encapsulated crisp rice comprises:
    about 60 to 90 percent crisp rice;
    about 5 to 20 percent sugar;
    about 0 to 10 percent coconut oil; and
    about 0 to 10 percent water.

42. The method of claim 40 wherein said encapsulated crisp rice comprises:
    about 50 to 99.8 percent crisp rice;
    about 0 to 50 percent sugar;
    about 0 to 50 percent coconut oil; and
    about 0 to 30 percent water.

43. A method for making individual pieces of extruded chewy granola comprising the steps of:
    (a) Mixing water with at least one dry ingredient selected from crisp rice and rolled grains to form pre-hydrated components;
    (b) Resting said pre-hydrated components for at least about one-half hour;
    (c) Mixing said pre-hydrated components with binder syrup to make a wet granola dough;
    (d) Extruding said wet granola dough through an opening to form an extruded granola; and
    (e) Cutting said extruded granola into pieces;
    (f) Drying said granola pieces.

44. The method of claim 43 wherein said extruded chewy granola pieces become extruded crunchy granola pieces after the drying of step (f).

45. The method of claim 43 wherein said extruded chewy granola pieces are filled with a filling at step (d) to become a filled granola piece.

* * * * *